L. KAMM.
CONDENSER CELL FOR KINEMATOGRAPH AND OPTICAL LANTERNS.
APPLICATION FILED APR. 12, 1911.
1,032,065.
Patented July 9, 1912.
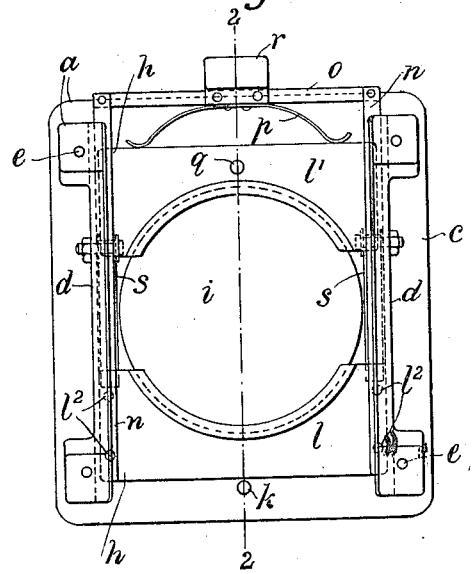
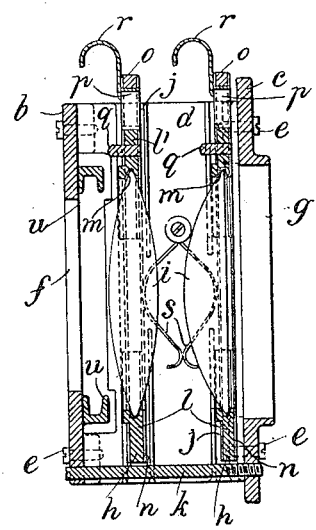
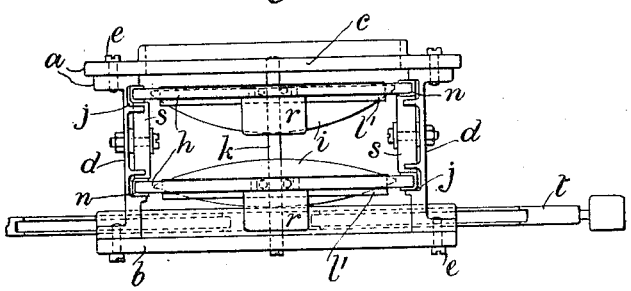
WITNESSES:
John Murtagh
L. J. Murphy
INVENTOR
Leo Kamm
BY
Goepel Goepel
ATTORNEYS

UNITED STATES PATENT OFFICE.

LEO KAMM, OF LONDON, ENGLAND.

CONDENSER-CELL FOR KINEMATOGRAPH AND OPTICAL LANTERNS.

1,032,065.  Specification of Letters Patent.  Patented July 9, 1912.

Application filed April 12, 1911. Serial No. 620,641.

*To all whom it may concern:*

Be it known that I, LEO KAMM, a subject of the King of Great Britain, residing in London, E. C., in the Kingdom of England, have invented certain new and useful Improvements in Condenser-Cells for Kinematograph and Optical Lanterns, of which the following is a specification.

My improvements relate to condenser cells for condenser lenses, enabling the lenses to be readily changed when necessary, and also obviating the great risk of breaking the lenses which arises when they are supported in a tightly fitting mount. The fact that the lenses of a condenser get very hot when projection takes place with a powerful arc lamp, such as is used in kinematograph projection, makes it very difficult to change the lens when it is broken, as it is necessary to wait until the condenser cools down.

It is known to have the complete condenser supported externally on the lantern, and to replace the same with an entirely new condenser, when any one lens breaks, but this method requires the replacement of the condenser complete with two lenses, as the mount of the condenser would be too hot to unscrew in order to replace a broken lens immediately. To obviate these difficulties I mount each lens in a separate slide or carrier. These slides are in the form of a flat plate with a circular hole of approximately the size of the lens to be carried, the said plate being in halves and having a groove on the inside edge of the hole enabling the halves of the plate to grip the lens when pressed together by means of a spring. These plates are conveniently made of metal. To one half of the said plate is riveted on each side a channeled bar in which the other half of the said plate is enabled to slide. A suitable spring exerting a pressure on the upper half of the plate keeps the lens in position.

The lantern front or stage consists of a box with one side open which is grooved on the inside to receive the sliding plates with the lenses which form the condenser. To keep the condenser lenses stationary springs are used on the inside of the box to press against the slides.

In order that the invention may be clearly understood, reference is had to the annexed drawing, in which—

Figure 1 is a front view of a condenser mount or stage for a projecting lantern constructed according to the invention, the front plate of the mount being removed to show one of the lens slides or carriers. Fig. 2 is a sectional side view of the mount, the section being on the line 2—2 of Fig. 1. Fig. 3 is a plan view of the mount, a lantern slide carrier being also shown in connection therewith.

Similar letters of reference indicate corresponding parts throughout the several figures of the drawings.

$a$ is the box or casing of the mount comprising the front and back plates $b$, $c$ respectively and side plates $d$, $d$ secured to the said plates $b$, $c$ by screws $e$, $e$.

$f$, $g$ are openings in the plates $b$, $c$ respectively, for the passage of the light from the projecting lantern.

$h$, $h$ are the lens slides or carriers each of which contains one of the lenses $i$, $i$ forming the condenser, the said slides being placed in their proper relative positions in the mount by engaging in grooves or ways $j$, $j$ formed in the side plates $d$, $d$ a stop $k$ in the form of a pin determining the position of the lenses in the mount; or, a plate can be used in place of the said pin.

$l$, $l^1$ are the two plates in each slide $h$ between the opposing edges of which plates the lens is held, the said edges being of arc-shaped form and grooved as at $m$ to receive the edge of the lens. The plates $l$, $l^1$ form a divided frame capable of relative movement one toward the other.

$n$, $n$ are the channeled bars secured to the plate $l$ by the rivets $l^2$, $l^2$, and within the grooves of which the plate $l^1$ is designed to allow of the lens being placed in position in the slide or removed therefrom.

$o$ is a bar connecting the upper ends of the bars $n$, $n$ together and $p$ is the spring secured to the said bar $o$ and which bears upon the upper edge of the plate $l^1$ to secure the lens when placed in position between the said plate and the plate $l$.

$q$ is a knob on the plate $l^1$ to enable it to be easily manipulated and $r$ is a curved lug on each of the slides $h$ to allow of it being removed from and replaced within the mount.

By the described construction it will be clear that in the event of one of the lenses $i$ becoming cracked or broken the slide $h$ containing it can be quickly removed from the mount by its lug $r$ and the lens dismounted by sliding the plate $l^1$ away from the plate $l$ another lens being then placed in position and secured by the said plate $l^1$ and the slide returned to its position within the mount.

$s, s$ are the springs supported on the sides $d, d$ of the mount, and serving to bear against the slides $h, h$ to hold them tightly in the grooves $j, j$ in the said sides.

$t$, Fig. 3 is a lantern slide carrier which may advantageously be used with the improved condenser mount, guides or supports $u, u$ being formed on the front plate $b$ to receive the said carrier and allow of its manipulation in front of the condenser.

Although in the drawing the opening or space between the sides $d, d$ for the insertion of the slides $h, h$ within the mount is shown at the top thereof, it may in some cases be desirable to arrange it at the side of the mount.

What I claim as new and desire to secure by Letters Patent is:—

1. A lens carrier for condenser-cells, comprising a divided frame whose parts are capable of relative movement one toward the other, means for holding the parts together after insertion of the lens, and means for receiving the said frame.

2. A lens carrier for condenser-cells, comprising a divided frame whose parts are capable of relative movement one toward the other, means for holding the parts together after insertion of the lens, and a casing provided with means for slidably receiving the said frame.

3. A lens carrier for condenser-cells, comprising a divided frame, consisting of two parts capable of relative movement one toward the other, means for holding the two parts together after insertion of the lens, a casing provided with means for slidably receiving the said frame, and means for securing the frame in the casing.

4. A lens carrier for condenser-cells, comprising a divided frame consisting of two parts capable of relative movement one toward the other, means for resiliently holding the two parts together after insertion of the lens, a casing provided with means for slidably receiving the said frame, and means for securing the frame in the casing.

5. A lens carrier for condenser-cells, comprising a channeled frame, a plate fixed to the said frame, a movable plate adapted to slide in said channeled frame, the edges of said plates being arc-shaped and grooved to engage and hold the lens between them, and a spring for pressing or holding the movable plate against the lens when in position between the plates.

6. A condenser-cell comprising two divided frames each formed of two parts capable of relative movement one toward the other, means for keeping the parts of the frames resiliently together after insertion of the lenses, and a casing provided with two guideways into which the said frames are slidably inserted.

7. A condenser-cell comprising two divided frames each formed of two parts capable of relative movement one toward the other, means for keeping the parts of the frames resiliently together after insertion of the lenses, a casing provided with two guideways into which the said frames are slidably inserted, and springs for holding the frames in position in the guide-ways of the casing.

In testimony, that I claim the foregoing as my invention, I have signed my name in presence of two subscribing witnesses.

LEO KAMM.

Witnesses:
R. WESTACOTT,
ALBERT MOND.